United States Patent

[11] 3,556,433

[72] Inventor Georges D. Abitboul
Los Angeles, Calif.

[21] Appl. No. 792,431
[22] Filed Jan. 21, 1969
[45] Patented Jan. 19, 1971
[73] Assignee Audio Magnetics Corporation
Gardena, Calif.
a corporation of California

[54] CASSETTE TAPE-WINDING CONTROL
16 Claims, 6 Drawing Figs.

[52] U.S. Cl. ........ 242/199, 242/210
[51] Int. Cl. ........ G11b 23/08
[50] Field of Search ........ 242/199, 200, 197, 198, 210, 75.4, 75.45, 75.2, 194

[56] References Cited

UNITED STATES PATENTS

| | | | |
|---|---|---|---|
| 3,259,331 | 7/1966 | Liddle | 242/199 |
| 3,495,787 | 2/1970 | Wallace | 242/74.1 |
| 3,502,284 | 3/1970 | Loewenberg et al. | 242/199 |
| 2,747,807 | 5/1956 | Hummel | 242/75.4X |
| 3,027,110 | 3/1962 | Andrews | 242/210 |

*Primary Examiner*—George F. Mautz
*Attorney*—White and Haefliger

ABSTRACT: The disclosure concerns the provision, within a magnetic tape cassette case, of a thin sheet of material bowed toward at least one of the tape rolls and engaging the tape with resiliency for accurately guiding tracking movement of the tape extending from the roll.

PATENTED JAN 1 9 1971 3,556,433

INVENTOR.
GEORGES D. ABITBOUL
By White & Haefliger
ATTORNEYS.

CASSETTE TAPE-WINDING CONTROL

BACKGROUND OF THE INVENTION

This invention relates generally to tape cassettes, and more particularly concerns the control of magnetic tape winding in such cassettes.

Tape cassettes typically include a hollow case and a pair of magnetic tape-winding reels mounted in the case to be turned when the cassette is removably mounted on playback equipment. Such tape typically consists of magnetic oxide coating on a polyester film backer, and in the past a number of problems have existed in connection with the travel and winding of such tape on the reels. One problem has been that of control of tape travel, it being desirable that minimum braking effect be exerted on the tape as it travels between the reels. Another problem has been that of winding stability, it being desired that the tightness of the winding on the reel decrease as the roll radius increases, (to compensate for the effect of tape drag increase as the roll diameter increases). These conditions are difficult to obtain and maintain on a high production basis, and efforts have been made to alleviate such problems through the provision of thin flat sheets of low friction film loosely placed between the tape rolls and the flat cassette wall; however, such film is not satisfactory due to the tendency of the loose tape to be displaced and to feed under and become caught under the film sheets when the cassette is moved about out of the playback equipment. This problem is aggravated by the buildup of static electricity in the case as the tape edge rubs against the film sheet whereby the tape may tend to adhere to the sheet. Further, the problem of inaccurate winding of the tape on a reel is not resolved satisfactorily by such sheets.

SUMMARY OF THE INVENTION

It is a major object of the invention to provide simple solutions to the above problems through the provision of means controlling tape travel with minimum friction to obtain a stable and accurate winding on the reel or reels, and to eliminate the problem of static friction buildup. Basically, the environment of the invention is a magnetic tape assembly incorporating a case having spaced walls and a pair of tape roll-supporting reels rotatable within the case to unwind tape off a roll on one reel and wind tape onto a roll on the other reel, there being space between the rolls and at least one of the walls, the invention being embodied in the provision of a thin sheet of material extending in that space with a portion of the sheet bowed toward at least one of the rolls, the bowed portion being sufficiently resiliently urged toward the roll as to engage its side as well as the edge of the tape extending from the roll for accurately guiding tracking movement of the tape relative to the roll. As will be seen, the sheet may typically include a thin electrically conductive and low friction coating on the bowed portion and presented toward the tape to accomplish accurate tape guiding and also to dissipate electrical charge to prevent buildup of static electricity on the tape.

It is another object of the invention to provide such a sheet wherein the bowed portion also extends toward the other roll in the same manner as described for guiding accurate tracking movement of the tape extending from that roll. Other objects include the provision of a second sheet as described to be located at the opposite side of the roll or rolls, the overall thickness of each such sheet being less than about 0.005 inches; and the provision of shoulders on a cassette wall and presented toward the cassette interior so that the sheet has interfitting relation with the shoulders tending to maintain the sheet in bowed condition, such shoulders also locating the sheet in centered condition and holding the sheet against falling from a section of the case during assembly of the cassette.

These and other objects of the invention, as well as the details of an illustrative embodiment, will be more fully understood from the following detailed description of the drawings in which:

DESCRIPTION OF THE PREFERRED EMBODIMENT

Figures 1, 2, 3, 4, 5, 6:
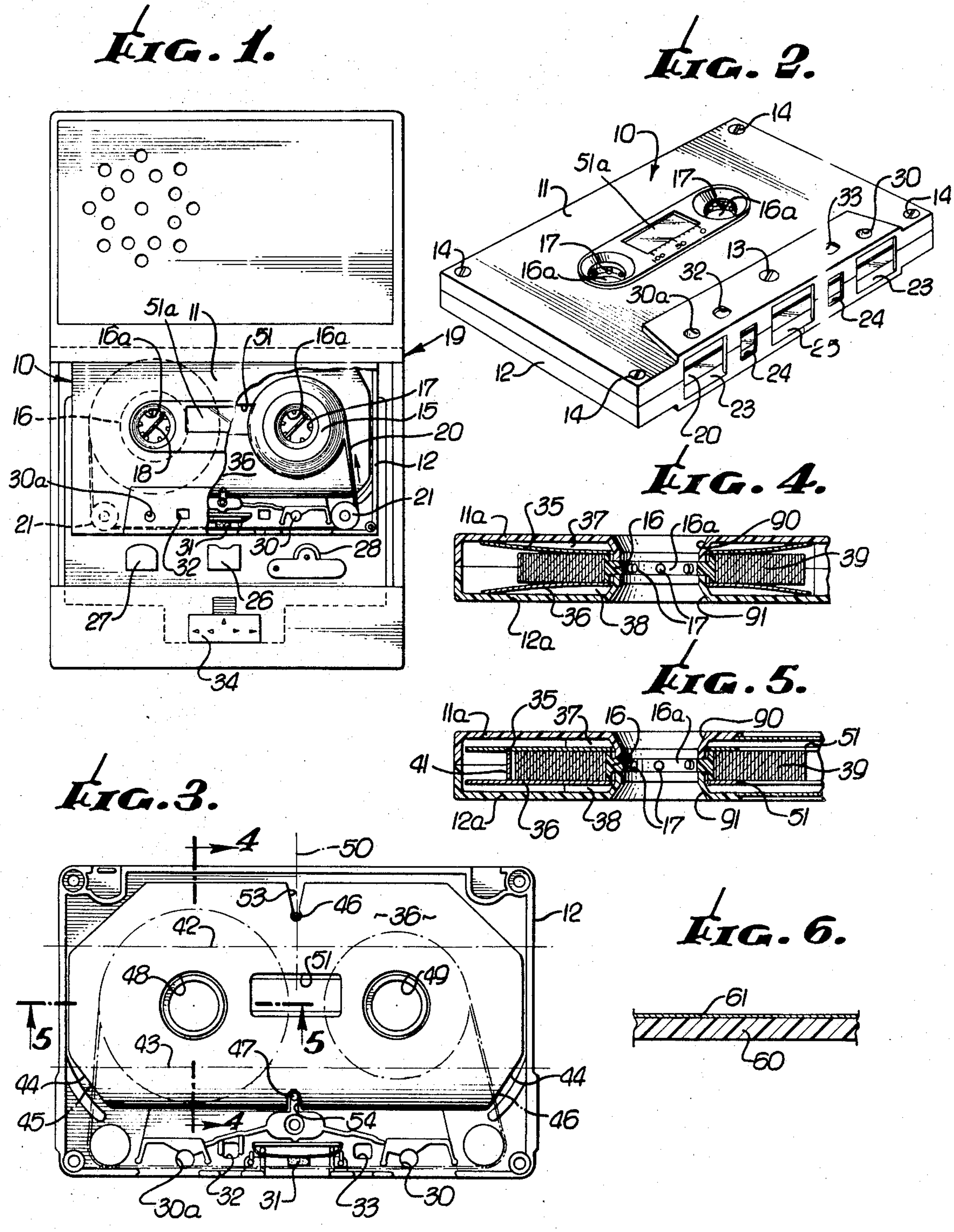
FIG. 1 is a plan view showing the relationship of the cassette to playback equipment.
FIG. 2 is a perspective view of the FIG. 1 cassette.
FIG. 3 is an enlarged plan view of the cassette interior with a bowed sheet therein.
FIGS. 4 and 5 are enlarged sections taken on lines 4—4 and 5—5 of FIG. 3.
FIG. 6 is a fragmentary section taken through the bowed sheet.

Referring first to FIGS. 1 and 2, the tape cassette is shown to include a hollow case 10 having upper and lower case sections 11 and 12 which are suitably attached together as by the fasteners 13 and 14. Mounted in the case are a pair of winding reels 15 and 16, suitable annular flanges in the case sections supporting the reels for rotation. The reels are themselves annular to form central openings 16*a* into which the lugs 17 on the reels project inwardly toward the axes of rotation, as shown. These lugs interfit a driving element shown at 18 in FIG. 1, and which is a part of the playback unit 19. Accordingly, during playback the tape 20 is wound on the reel 15, as shown, in response to rotation of the driving element 18.

Also contained within the case are two idler rolls 21 about which the tape travels during advancement thereof. In this regard, the case has an elongated opening along one edge thereof to expose tape traveling lengthwise along said edge. FIG. 2 shows the elongated opening in the form of sections 23, 24 and 25 through which the tape is exposed to the exterior during tape travel between the rollers 21. In this regard, when the cassette is mounted on the playback equipment 19, the tape is exposed to a magnetic read/write head 26 opposite opening 25, an erase head 27 opposite an opening 23 and an idler roller 28 opposite the other opening 23. In this regard, the heads 26 and 27 and the roller 28 are relatively movable into engagement with the tape proximate the openings 23 and 25 in order to enable operation of the equipment. Similarly, these elements are movable relatively away from the tape to facilitate mounting and demounting of the cassette in the playback equipment. Aligned openings 30 in the case are adapted to receive a rotary capstan immediately behind the tape for driving the latter when the idler roller 28 urges the tape into contact with the capstan. A similar pair of aligned openings appear at 30*a* for the same use when the cassette is turned over for driving the tape in the opposite direction.

A spring urged support 31 is located inwardly of the tape and opposite the magnetic head 26, the support being carried by the cassette and typically consisting of a piece of soft felt. The support serves as a backup for the tape when the magnetic head is brought into contact with the opposite side of the tape. Finally, two pairs of aligned openings 32 and 33 are formed in the case to receive posts for locating and locking the cassette in place upon the playback equipment 19. A manual control is shown at 34 and is operable to effect displacement of the heads 26 and 27 and roller 28 relatively into engagement with the tape and to initiate and stop advancement of the tape as described.

Coming now to the improvements with which the invention is more specifically concerned, as related to the cassette, FIGS. 3—5 show first and second thin sheets 35 and 36 of material extending in the spaces 37 and 38 between the roll 39 and the case walls 11*a* and 12 *a*. The sheets have bowed portions, as for example may have the curvature as seen in FIG. 4, which project toward the opposite sides of roll 39, such bowed portions being sufficiently resiliently urged toward the roll as to engage those opposite sides of the roll and also the opposite edges of the tape section 41 extending from the roll as seen in FIG. 5. With such light pressural engagement thus afforded, tracking movement of the tape section 41 is guided relative to the roll, whereby the tape may be accurately wound on the roll, with stability as referred to in the introduction. The bowed portion in contact with the roll sides and tape may be of a width defined by the lateral spacing of longitudinal lines 42 and 43 in FIG. 3, those lines also indicating that the bowed portion is longitudinally elongated to engage both rolls, as described, so that guided tracking is accomplished for both directions of winding. Thus, the tape floats between the two sheets, within limits imposed by the looseness of fit between the reels 15 and 16 and the inturned annular flanges 90 and 91 of the case sections. Note further that the tape is kept spaced from the peripheral edges 44 of the sheets 35 and 36, which are outside the zone defined between lines 42 and 43, whereby the tape which crosses those edges (at locations indicated by broken lines 45 and 46) cannot feed under the sheets.

Each of the sheets has interfitting relation with shoulders on the case, whereby the sheet remains centered and in bowed condition, as described. One advantageous form of such shoulders is illustrated by the laterally spaced posts 46 and 47 upstanding from each of the case sections 11 and 12. Posts 46 and 47 are on a lateral axis 50 midway between the reel openings 48 and 49 in the sheet, that axis crossing a window opening 51 in the sheet through which the tape rolls may be viewed. The sheet is notched at 53 and 54, inwardly from its laterally opposite edges, to receive the posts with interference. Such interference tends to hold the sheet to the posts and case section, whereby the latter may be freely manipulated, and turned upside down during assembly, without causing the sheet to separate from the case section.

Finally, reference to FIG. 6 shows a form of sheet construction found to be particularly advantageous. That sheet comprises a thin backer 60 on which thinner coating 61 of electrically conductive and low friction material is formed. One such coating consists of graphite particles in a suitable binder such as vinyl, and the backer may consist of a polyester film. The overall thickness of the sheet is less than about 0.003 inches, the backer thickness for example being between 0.0015 and 0.002 inches, and the graphite coating about 0.0002 inches thick. As mentioned, the coating 61 engages the tape and dissipates any electrical charge over a wide area (the entire sheet may be so coated) and also reduces tape drag.

Finally, the coated sheet may be given its curvature by heating to softening temperature (200°—220° F. in the case of polyester) while curved, held at that temperature for a few minutes, and thus cooled, whereby such curvature or bow is made permanent. Windows in the case walls 11*a* and 12*a* are indicated by the window 51*a* in wall 11*a*.

I claim:

1. In a magnetic tape cassette assembly, the combination comprising:

a. a case having spaced walls;

b. a pair of tape roll supporting reels rotatable within the case to unwind tape off a roll on one reel and wind tape onto a roll on the other reel, there being space between the rolls and at least one of the walls; and c. a first thin sheet of material extending in said space with a portion bowed toward at least one of the rolls, said bowed portion being sufficiently resiliently urged toward said one roll as to engage the roll side and the edge of the tape extending from the roll for guiding tracking movement of the tape extending from the roll, relative to the roll.

2. The combination of claim 1 wherein said portion is also bowed toward the other roll and sufficiently resiliently urged toward said said other roll as to engage that roll side and the edge of the tape extending from that roll for guiding tracking movements of the tape extending from that roll, relative to that roll.

3. The combination of claim 1 wherein the sheet includes a thin electrically conductive and low friction coating on said bowed portion and presented toward said roll.

4. The combination of claim 3 wherein the sheet includes a polyester backer supporting said coating.

5. The combination of claim 1 including a second sheet in a space between the rolls and the other of said walls, said second sheet having a bowed portion like that of said first sheet for engagement with the opposite side of at leas one roll.

6. The combination of claim 1 wherein said reels are spaced apart longitudinally and said sheet bowed portion is longitudinally elongated, there being bow curvature in a lateral direction.

7. The combination of claim 1 wherein the sheet overall thickness is less than about 0.003 inches.

8. The combination of claim 1 wherein there are shoulders on one of said walls and presented toward the cassette interior and said sheet has interfitting relation with said shoulders tending to maintain said sheet portion in bowed condition.

9. For combination in a magnetic tape cassette assembly that includes a case having spaced sections and a pair of tape roll-supporting reels rotatable within the case to unwind tape off a roll on one reel and wind tape onto a roll on the other reel, there being space between the rolls and a wall of at least one section, the improvement comprising a thin sheet of material sized to be peripherally confined in said space and having a permanently bowed portion located to project toward said rolls and to be resiliently urged sufficiently toward said rolls as to engage the roll sides and the edge of tape extending from the rolls for guiding tracking movement of the tape relative to said rolls.

10. The combination of claim 9 wherein the sheet comprises a layer of graphite on a backer, the sheet containing through openings to interfit shoulder structure on said wall.

11. In a magnetic tape cassette assembly including a case having spaced walls, and a pair of tape roll-supporting reels rotatable within the case to unwind tape off a roll on one reel and wind tape onto a roll on the other reel, there being space between the rolls and at least one of the walls, the improvement comprising a first thin sheet of material extending in said space and having low friction, nonmetallic coating thereon and presented toward the rolls for engagement with the roll sides and the edges of the tape extending from the rolls, the sheet defining a window in alignment with a window in said one wall and with a case interior zone between the reels, the sheet window sized to permit viewing through the case wall window of the extent of tape winding on the reels.

12. The improvement of claim 11 wherein the sheet is perforated to receive shoulder means on the case to position the sheet in the case.

13. The improvement of claim 11 including a second sheet like the first-mentioned sheet and located in a space between the rolls and the other of said walls which has a window therein corresponding to said one wall window.

14. In a magnetic tape cassette assembly including a case having spaced walls and a pair of tape roll-supporting reels rotatable within the case to unwind tape off a roll on one reel and wind tape onto a roll on the other reel, there being space between the rolls and at least one of the walls, the improvement comprising a first thin sheet of material extending in said space and having low action coating thereon and presented toward the rolls for engagement with the roll sides and the edges of the tape extending from the rolls, the sheet defining perforations proximate opposite edges thereof, said perforations extending into the sheet from said opposite edges thereof and tapering away from said edges to receive shoulder means on the case to position the sheet in the case interior.

15. For combination in a magnetic tape cassette assembly including a case having spaced walls, and a pair of tape roll-supporting reels rotatable within the case to unwind tape off a roll on one reel and wind tape onto a roll on the other reel, there being space between the rolls and at least one of the walls, the improvement comprising a this sheet of material sized for confinement in said space and having low friction, nonmetallic surfacing located for presentment toward the rolls to engage the roll sides and the edges of the tape extending from the rolls, the sheet defining a window located to align with a window in said one wall and with a case interior zone between the reels when the sheet is so confined, the sheet window sized to permit viewing through the case wall window of the extent of tape winding on the reels.

16. For combination in a magnetic tape cassette assembly including a case having spaced walls, and a pair of tape roll-supporting reels rotatable within the case to unwind tape off a roll on one reel and wind tape onto a roll on the other reel, there being space between the rolls and at least one of the walls, the improvement comprising a thin sheet of material sized for confinement in said space and having low friction surfacing located for presentment toward the rolls to engage the roll sides and the edges of the tape extending from the rolls, the sheet defining perforations proximate opposite edges thereof said perforations extending into the sheet from said opposite edges thereof and tapering away from said edges to receive shoulder means on the case to position the sheet in the case interior.